United States Patent
Sampathkumar et al.

(10) Patent No.: US 9,690,608 B2
(45) Date of Patent: Jun. 27, 2017

(54) METHOD AND SYSTEM FOR MANAGING HOSTS THAT RUN VIRTUAL MACHINES WITHIN A CLUSTER

(71) Applicant: VMware, Inc., Palo Alto, CA (US)

(72) Inventors: Badhrinath Sampathkumar, Sunnyvale, CA (US); Aashish Parikh, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/303,259

(22) Filed: Jun. 12, 2014

(65) Prior Publication Data

US 2015/0363216 A1   Dec. 17, 2015

(51) Int. Cl.
  G06F 9/455     (2006.01)
  H04L 12/911    (2013.01)
  H04L 12/24     (2006.01)

(52) U.S. Cl.
  CPC ...... *G06F 9/45558* (2013.01); *H04L 41/0816* (2013.01); *H04L 47/70* (2013.01); *G06F 2009/4557* (2013.01)

(58) Field of Classification Search
  None
  See application file for complete search history.

(56) References Cited

U.S. PATENT DOCUMENTS

| | | | |
|---|---|---|---|
| 6,985,937 B1 * | 1/2006 | Keshav et al. | 709/223 |
| 7,290,259 B2 * | 10/2007 | Tanaka et al. | 718/1 |
| 8,321,862 B2 * | 11/2012 | Swamy et al. | 718/1 |
| 8,495,218 B1 * | 7/2013 | Shao et al. | 709/226 |
| 8,799,920 B2 * | 8/2014 | Lubsey et al. | 718/105 |
| 8,843,933 B1 * | 9/2014 | Holler et al. | 718/104 |
| 2004/0044827 A1 * | 3/2004 | Carlson et al. | 711/4 |
| 2005/0289540 A1 * | 12/2005 | Nguyen et al. | 718/1 |
| 2008/0301673 A1 * | 12/2008 | Kawasaki | G06F 9/45516 718/1 |
| 2009/0031307 A1 * | 1/2009 | Chodroff et al. | 718/100 |
| 2010/0153945 A1 * | 6/2010 | Bansal | G06F 9/4881 718/1 |
| 2010/0257269 A1 * | 10/2010 | Clark | 709/226 |
| 2011/0191477 A1 * | 8/2011 | Zhang et al. | 709/226 |
| 2011/0231696 A1 * | 9/2011 | Ji et al. | 714/3 |
| 2011/0282986 A1 * | 11/2011 | Phaal | 709/224 |

(Continued)

OTHER PUBLICATIONS

"DRS Performance and Best Practices." VMWare. N.p., Jan. 9, 2009. Web. Aug. 3, 2015. <http://www.vmware.com/files/pdf/drs_performance_best_practices_wp.pdf>.*

(Continued)

*Primary Examiner* — Wei Zhen
*Assistant Examiner* — Binh Luu

(57) ABSTRACT

Embodiments of a non-transitory computer-readable storage medium and a computer system are disclosed. In an embodiment, a non-transitory computer-readable storage medium containing program instructions for managing host computers that run virtual machines into host-groups within a cluster is disclosed. When executed, the instructions cause one or more processors to perform steps including determining if a virtual machine entity needs additional resources and, if the virtual machine entity needs additional resources, mapping a host computer to a host-group with which the virtual machine entity is associated.

20 Claims, 9 Drawing Sheets

(56) References Cited

U.S. PATENT DOCUMENTS

| | | | |
|---|---|---|---|
| 2011/0314345 A1* | 12/2011 | Stern et al. | 714/47.1 |
| 2013/0014107 A1* | 1/2013 | Kirchhofer | 718/1 |
| 2013/0054600 A1* | 2/2013 | Somogyi | G06F 17/30575 707/737 |
| 2013/0086593 A1* | 4/2013 | Sloma | G06F 9/505 718/105 |
| 2013/0097319 A1* | 4/2013 | Ahmad | G06F 9/5033 709/226 |
| 2013/0160014 A1* | 6/2013 | Watanabe | G06F 9/50 718/1 |
| 2013/0346969 A1* | 12/2013 | Shanmuganathan et al. | 718/1 |
| 2014/0059228 A1* | 2/2014 | Parikh | 709/226 |
| 2014/0108722 A1* | 4/2014 | Lipchuk et al. | 711/113 |
| 2014/0258446 A1* | 9/2014 | Bursell | 709/217 |
| 2015/0040131 A1* | 2/2015 | Shan | G06F 9/5027 718/1 |
| 2015/0193245 A1* | 7/2015 | Cropper | G06F 9/45533 718/1 |
| 2015/0341223 A1* | 11/2015 | Shen | H04L 12/24 709/223 |

OTHER PUBLICATIONS

"Resource Management with VMware DRS." VMWare. N.p., Nov. 22, 2006. Web. Aug. 3, 2015. <https://www.vmware.com/pdf/vmware_drs_wp.pdf>.*

"VMware Distributed Resource Scheduler (DRS)." VMWare. N.p., Apr. 21, 2009. Web. Aug. 3, 2015. <http://www.vmware.com/files/pdf/VMware-Distributed-Resource-Scheduler-DRS-DS-EN.pdf>.*

VMWare. "Managing Storage I/O Resources." VMWare. N.p., May 12, 2010. Web. Jan. 2, 2016. <https://pubs.vmware.com/vsphere-51/index.jsp?topic=%2Fcom.vmware.vsphere.resmgmt.doc%2FGUID-7686FEC3-1FAC-4DA7-B698-B808C44E5E96.html>.*

* cited by examiner

METHOD AND SYSTEM FOR MANAGING HOSTS THAT RUN VIRTUAL MACHINES WITHIN A CLUSTER

BACKGROUND

Virtual machines (VMs) are software-based emulations of physical computers. Although virtual machines are software-based emulations, the emulations still utilize physical resources in physical machines referred to as host computers. The host computers can be divided into logical groups, referred to as host-groups, which can be used to implement certain constraints or preferences regarding the placement of VMs on the host computers. Additionally, since host computers can be connected by a network to form a cluster, host-groups can be used to divide a large cluster into more manageable pieces without having to create multiple clusters. Similarly, VMs can be divided into logical groups referred to as VM-groups, to further help implement certain constraints or preferences as well as to divide up large clusters.

Typically, a distributed resource scheduler (DRS) is employed to efficiently allocate host resources to VMs in a cluster. For example, a DRS can perform the initial placement of VMs and can dynamically migrate VMs among host-groups to balance the performance load and/or to enforce DRS requirements.

While VMs can be migrated from one host computer to another automatically by a DRS, host-groups are typically statically created and manually mapped by an administrator. The manual mapping relies heavily on the expertise of the administrator, thus making the manual mapping of host computers amongst host-groups a slow and inefficient process.

SUMMARY

In an embodiment, a non-transitory computer-readable storage medium containing program instructions for managing host computers that run virtual machines into host-groups within a cluster is disclosed. When executed, the instructions cause one or more processors to perform steps including determining if a virtual machine entity needs additional resources and, if the virtual machine entity needs additional resources, mapping a host computer to a host-group with which the virtual machine entity is associated.

In another embodiment, a computer system having at least one processor and memory for managing host computers in a cluster is disclosed. The at least one processor is configured to execute instructions stored in the memory to perform steps including determining if a virtual machine entity needs additional resources and, if the virtual machine entity needs additional resources, mapping an available host computer to a host-group with which the virtual machine entity is associated.

In another embodiment, a non-transitory computer-readable storage medium containing program instructions for managing host computers that run virtual machines into host-groups within a cluster is disclosed. When executed, the program instructions cause one or more processors to perform steps including mapping a host computer to a host-group associated with a virtual machine entity that needs additional resources and mapping the host computer back to its origin group once the host computer is no longer needed by the virtual machine entity.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
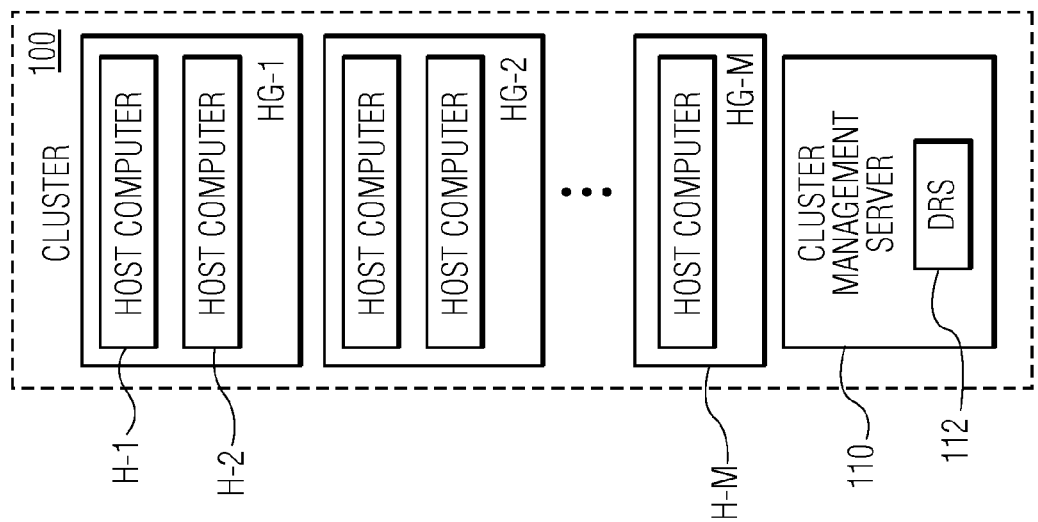
FIG. 1 is a block diagram of a DRS cluster.

Turning now to FIG. 1, a block diagram of a DRS cluster 100 is shown. Host computers H-1, H-2 . . . H-M (where M is a positive integer) are running in the DRS cluster and are connected to each other via a network (not shown).

In the illustrated embodiment, the host computers H-1, H-2 . . . H-M (where M is a positive integer) and a cluster management server 110 run in the cluster 100. The number of host computers included in the cluster can be any number from, for example, one to several hundred or more. While at least some of the host computers may be virtualized, in the embodiment of FIG. 1, the host computers are physical computer systems that host or support one or more VMs so that the VMs are executing on the physical computer systems. The host computers may be servers that are commonly found in data centers. As an example, the host computers may be servers installed in one or more server racks. Typically, the host computers of a cluster are located within the same server rack.

A cluster management server 110 in the cluster operates to monitor and manage the host computers H-1, H-2 . . . H-M. The cluster management server may be configured to monitor the current configurations of the host computers and the VMs running on the host computers, for example, VMs, in the cluster. The monitored configurations may include the hardware configuration of each of the host computers, such as CPU type and memory size, and/or software configurations of each of the host computers, such as operating system (OS) type and installed applications or software programs. The monitored configurations may also include VM hosting information, i.e., which VMs are hosted and running on which host computers. The monitored configurations may also include VM information. The VM information may include the size of each of the VMs, virtualized hardware configurations for each of the VMs, such as virtual CPU type and virtual memory size, software configurations for each of the VMs, such as OS type and installed applications or software programs running on each of the VMs, and virtual storage size for each of the VMs. The VM information may also include resource parameter settings, such as demand, limit, reservation and share values for various resources, e.g., CPU, memory, network bandwidth and storage, which are consumed by the VMs. The demands of the VMs for the consumable resources are monitored by the host computers hosting the VMs, and provided to the cluster management server.

In some embodiments, the cluster management server 110 may be implemented on a separate physical computer or computers. In other embodiments, the cluster management server may be implemented as a software program running on a host computer or on a virtual machine. In an implementation, the cluster management server is a VMware vCenter™ server having a VMware Distributed Resource Scheduler™ 112.

Figure 2:
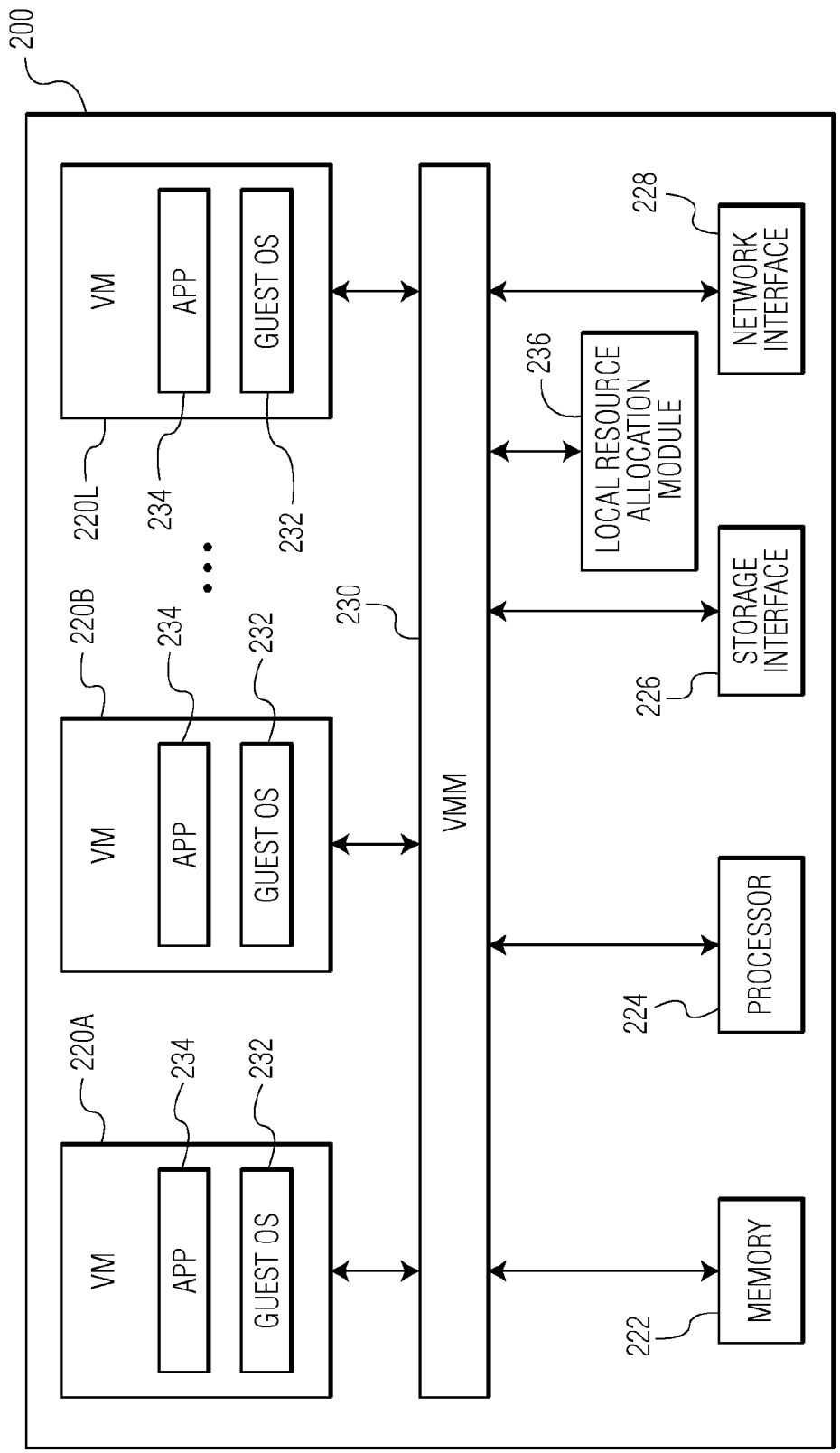
FIG. 2 is a block diagram of a host computer from the DRS cluster of FIG. 1.

Turning now to FIG. 2, components of a host computer 200 that is representative of the host computers H-1, H-2 . . . H-M, are shown. In FIG. 2, the physical connections between the various components of the host computer are not illustrated. In the illustrated embodiment, the host computer is configured to support a number of VMs 220A, 220B . . . 220L (where L is a positive integer). The number of VMs supported by the host computer can be anywhere from one to more than one hundred. The exact number of VMs supported by the host computer is limited by the physical resources of the host computer or other constraints such as licensing. The VMs share at least some of the hardware resources of the host computer, which includes system memory 222, one or more processors 224, a storage interface 226, and a network interface 228. The system memory 222, which may be random access memory (RAM), is the primary memory of the host computer. The processor 224 can be any type of processor, such as a central processing unit (CPU) commonly found in a server. The storage interface 226 is an interface that allows the host computer to communicate with a datastore cluster. As an example, the storage interface may be a host bus adapter or a network file system interface. The network interface 228 is an interface that allows the host computer to communicate with other devices in the cluster. As an example, the network interface may be a network adapter.

In the illustrated embodiment, the VMs 220A, 220B . . . 220L run on top of a virtual machine monitor (VMM) 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other.

Similar to the host computers H-1, H-2 . . . H-M in FIG. 1, the VMs 220A, 220B . . . 220L shown in FIG. 2 are able to communicate with other computer systems connected to the network using the network interface 228 of the host computer 200. In addition, the VMs are able to access a datastore cluster using the storage interface 226 of FIG. 2 of the host computer.

The host computer 200 also includes a local resource allocation module 236 that operates as part of a resource management system, such as a distributed resource scheduler system, to manage resources consumed by the VMs 220A, 220B . . . 220L. The local resource allocation module in each host computer cooperatively operates with the local resource allocation modules in the other host computers of the cluster 100 to generate resource allocation settings and perform resource scheduling, which includes balancing the loads of software processes and/or storage resource scheduling, among the host computers H-1, H-2 . . . H-M of the host computer cluster 100. Although the local resource allocation module is illustrated in FIG. 2 as being separate from the virtual machine monitor 230, the local resource allocation module may be implemented as part of the virtual machine monitor. In some embodiments, the local resource allocation module is implemented as software programs running on a host computer. However, in other embodiments, the local resource allocation module may be implemented using any combination of software and hardware.

When a cluster is initially configured, one or more VMs needed for a desired functionality are typically logically grouped together, with the logical grouping being referred to herein as a "VM entity." For example, VMs needed to run tax applications are instantiated and grouped together as a VM entity. Typically, VM entities are defined by VM rules such as affinity or anti-affinity requirements between VMs. For example, a VM rule could require that all VMs running tax applications be included in the same VM entity.

Host-groups are defined by host-group rules that establish criteria for host computers that can be assigned to a host-group. Host-group rules can include, for example, affinity or anti-affinity rules, licensing rules, ratio requirements, and/or compatibility rules. A host-group affinity rule might, for example, require that all host computers supporting the same VM entity be in the same host-group and, conversely, a host-group anti-affinity rule might, for example, require that host computers supporting different VM entities not be in the same host-group. Licensing rules might, for example, limit a host-group associated with a VM entity running a particular application to a number of host computers as limited by licensing requirements (e.g., only four host computers can be in the host-group). A ratio requirement, for example, might require that for every three host computers added to a host-group to run an application, one host computer must be added to the host-group to run a web server. Compatibility rules, for example, might require that all host computers added to a host-group must use an Intel processor. VM rules and host-group rules can be either soft rules (i.e., rules that can be violated) or hard rules (i.e., rules that cannot be violated).

Figure 3:
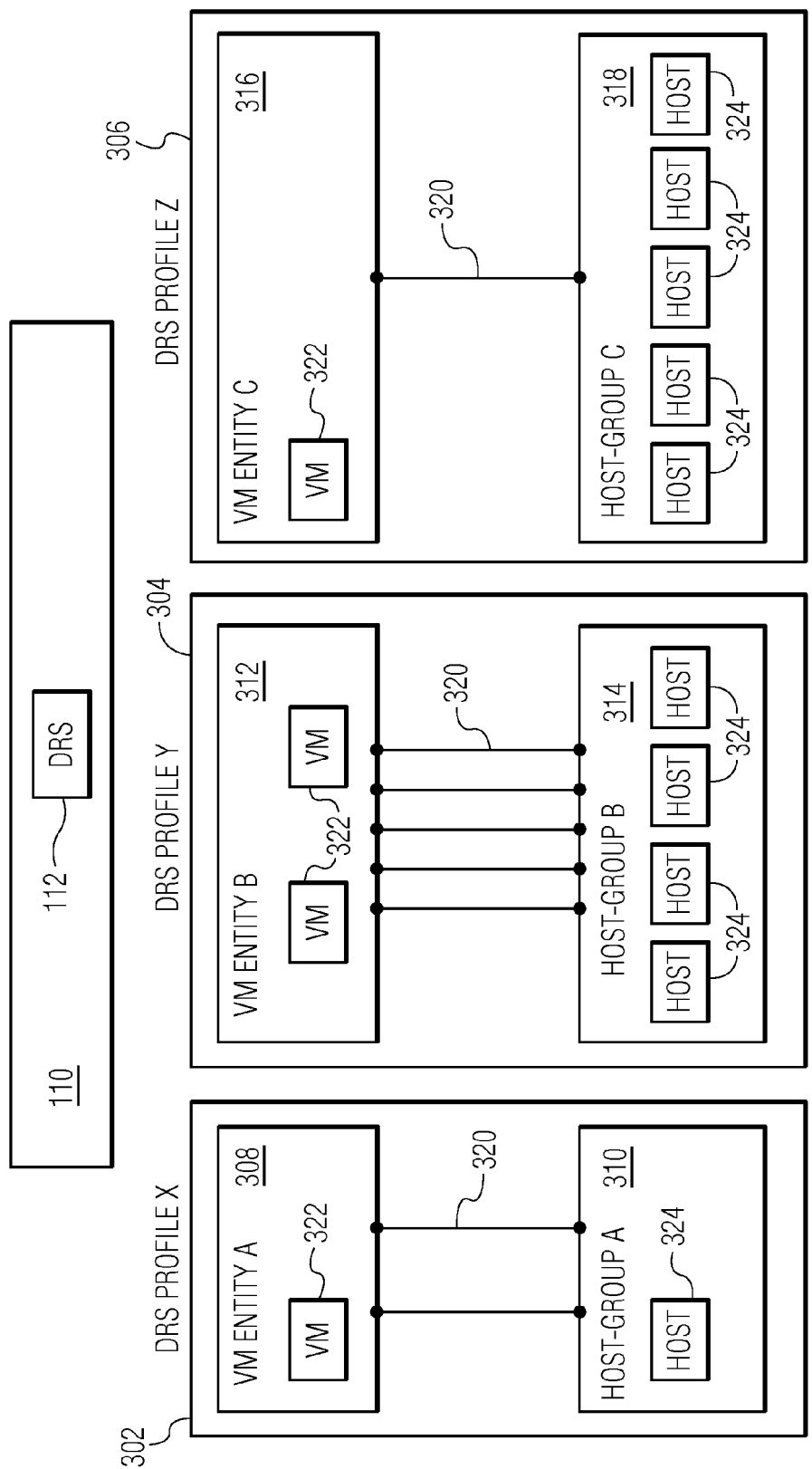
FIG. 3 depicts VM entities associated with host-groups in compliance with DRS rules.

VM entities can be associated with host-groups in order to simplify the management of resources that are available to VM entities. Once VM entities and host-groups have been created and the host-groups have been associated with the VM entities, a DRS can be configured to manage host computers in the cluster in compliance with sets of VM and host-group rules, referred to herein as "DRS profiles." FIG. 3 depicts a cluster management server 110 running a DRS 112 and three different DRS profiles that are actively being managed by the DRS. As shown in FIG. 3, the DRS profiles include DRS profile X 302, DRS profile Y 304, and DRS profile Z 306. In the embodiment of FIG. 3, the DRS manages DRS profile X by pairing VM entity A 308 with Host-group A 310, with VM entity A including one VM 322 and Host-group A including one host computer 324. The DRS manages DRS profile Y by pairing VM entity B 312 with Host-group B 314, with VM entity B including two VMs 322 and Host-group B including four host computers 324. The DRS manages DRS profile Z by pairing VM entity C 316 with Host-group C 318, with VM entity C including one VM 322 and Host-group C including five host computers. In each DRS profile, the VM entity and the host-group are endpoints for various rules (e.g., affinity rules and/or licensing rules) that pair the VM entity with the host-group as indicated by the lines 320 that connect between the VM entities and the host-groups. For example, DRS profile X has two rules: one that requires that no more than four hosts be in the host-group due to a licensing rule and one that the host computers use Intel processors due to a compatibility requirement. By following the rules that pair VM endpoints with host-group endpoints according to a DRS profile, a DRS can automatically manage host-group membership for host computers in the cluster.

A VM environment can change rapidly as demand fluctuates. The change in demand can be uneven causing host computers in some host-groups to be overwhelmed while host computers in other host-groups remain idle. Administrators typically manually map host computers from one host-group to another in order to adapt to the demand fluctuations. However, because clusters can often include several hundred host-computers and several thousand VMs, it is difficult for administrators to manually map host computers quickly enough to adapt to demand fluctuations. In an embodiment of the invention, a determination is made as to whether a VM entity needs additional resources and, if additional resources are needed, an available host computer is mapped to a host-group associated with the VM entity. For example an administrator may initially map host computers into host-groups and, if a VM entity needs additional resources, a DRS will automatically map host computers from their initial mapping to other host-groups in order to provide the needed additional resources to the VM entity. By automatically mapping available host computers to host-groups associated with VM entities that need additional resources, the initial mapping of host computers can be modified to adapt to fluctuations in demand on a larger scale than an administrator could manually accommodate.

In an embodiment, host computers can be mapped from one host-group to another host-group in response to, for example, a user-initiated request (e.g., a manual request to map a host computer by an administrator), a calendared event (e.g., planned system down-time), or an observed need. In an embodiment, an observed need can be either a reactive need or a predictive need. A reactive need can be a need created in response to an immediate change in resource demand by a VM. For example, a sudden spike in activity by VMs in a VM entity could create a reactive need. A predictive need can be identified by finding a pattern in previous recorded demand and extrapolating that pattern into the future, for example, an identified pattern of reoccurring high usage during a particular time of day is extrapolated into the future to identify a predictive need for additional resources at that particular time of day. If host computers need to be mapped from one host-group to another host-group, then the DRS can select an available host computer in the cluster and trigger the mapping of the host computer from its host-group to a different host-group. In an embodiment, whether a host computer needs to be mapped to a different host-group is determined by a DRS responding to one of many triggers. For example, if VM entity A experiences a sudden spike in activity such that Host-group A is operating at maximum capacity and a host computer in Host-group C is available, then the DRS will be triggered by the sudden spike in activity to attempt to find an available host computer in the cluster, to select the available host computer in Host-group C, and to trigger the mapping of the host computer from Host-group C to Host-group A. The mapping process is discussed further below with reference to FIGS. 4A and 4B.

In an embodiment, a host computer is considered to be available or can be made available if no VMs are running on the host computer or if the host computer is under-utilized. In an embodiment, a host computer is under-utilized if all VMs running on the host-group to which the host computer is mapped can be supported after a host computer in the host-group fails. For example, in the embodiment of FIG. 3, if a host computer in Host-group C fails, and the VM in VM entity C would still be fully supported, then at least one host computer in Host-group C is available and can be mapped to another host-group if needed.

By managing host-groups in accordance with host-group rules from DRS profiles, host computers can be mapped from one host-group to another host-group without having to redefine every rule associating the host-group with a VM entity for each host computer. Rather, when a host computer is mapped to a host-group, the host computer is automatically configured to adopt the rules defining the host-group. Additionally, if mapping a host computer to a host-group does not violate the rules of a DRS profile, then an assumption can be made that all VMs in the VM entity can run on all the host computers in the associated host-group. For example, if a VM entity associated with a host-group includes one hundred VMs, the DRS need only compare a host computer with the host-group rules to determine if all of the one hundred VMs can run on the host computer without having to perform one hundred individual tests before mapping the host computer to the host-group. By reducing the steps required to map a host computer to a host-group, host computers can be automatically mapped between host-groups with greater responsiveness since less time is needed to confirm that a mapping is allowed.

Figure 4A:
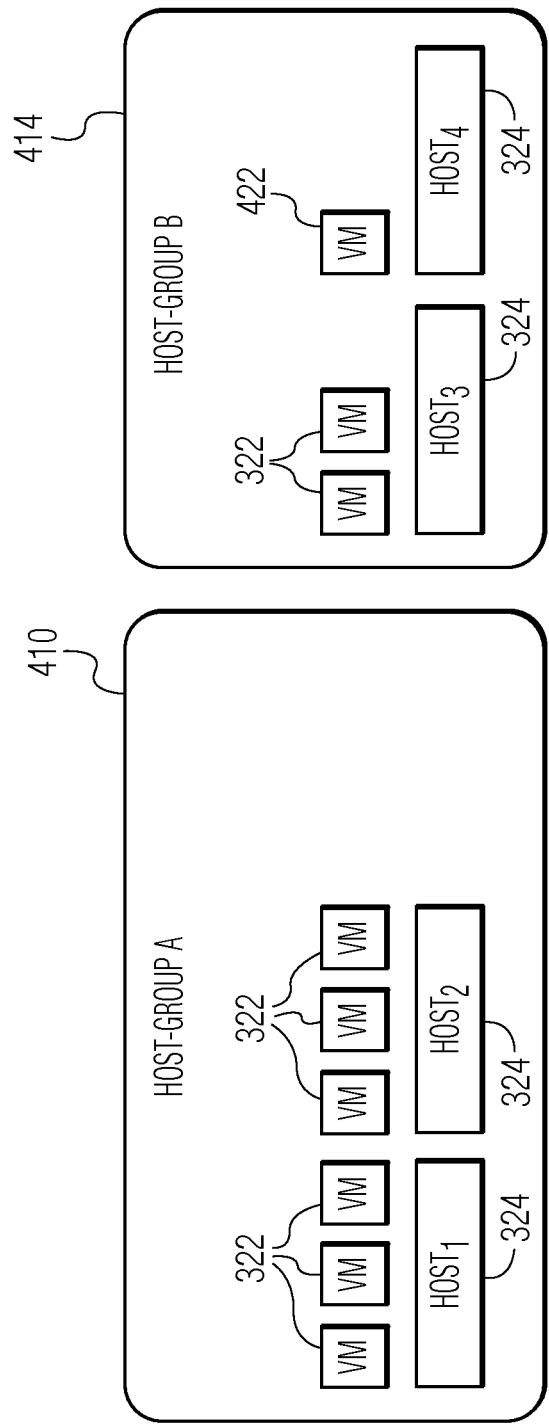
FIG. 4A is a block diagram of host-groups within a DRS cluster.
Figure 4B:
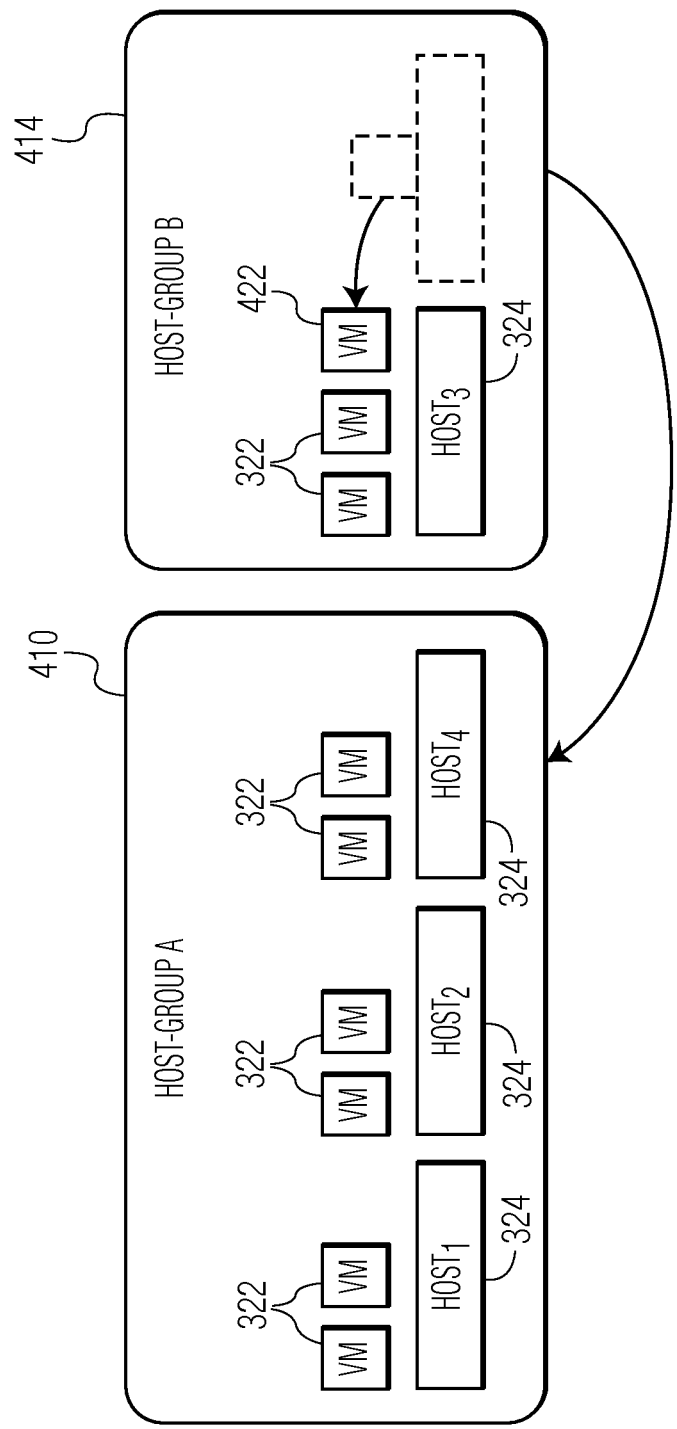
FIG. 4B is a block diagram of the host-groups of FIG. 4A after a host computer has been mapped.

FIGS. 4A and 4B illustrate the mapping of a host computer from a first host-group to a second host-group in accordance with an embodiment of the invention. FIG. 4A depicts VMs 322 running on host computers 324 managed by a DRS as described above. In the embodiment of FIG. 4A, the cluster has an initial logical grouping of host computers within Host-group A 410 and Host-group B 414. Host-group A initially includes HOST 1 and HOST 2 with three VMs running on HOST 1 and three VMs running on HOST 2 and Host-group B initially includes HOST 3 and HOST 4 with two VMs running on HOST 3 and one VM 422 running on HOST 4. The host computers in Host-group A and Host-group B can be mapped to either host-group without violating a corresponding DRS profile. In the embodiment of FIG. 4A, the DRS determines that the VMs running on Host-group A need additional resources and that HOST 4 in Host-group B is available. The DRS then triggers the mapping of HOST 4 from Host-group B to Host-group A. In an embodiment, the mapping is performed by a migration module, such as a VMware vMotion™, configured to implement instructions from the DRS. In accordance with the embodiment, the VM 422 running on HOST 4 is migrated to HOST 3 and then HOST 4 is mapped from Host-group B to Host-group A, as illustrated in FIG. 4B, so that Host-group A now includes HOST 1, HOST 2, and HOST 4. VMs are migrated from HOST 1 and HOST 2 to HOST 4 so that each host computer in Host-group A runs two VMs 322 while Host-group B only includes HOST 3 that now runs three VMs 322 and 422. Thus, HOST 4 from Host-group B has been mapped to Host-group A and is used to support two VMs previously running on HOST 1 and HOST 2.

Figure 5A:
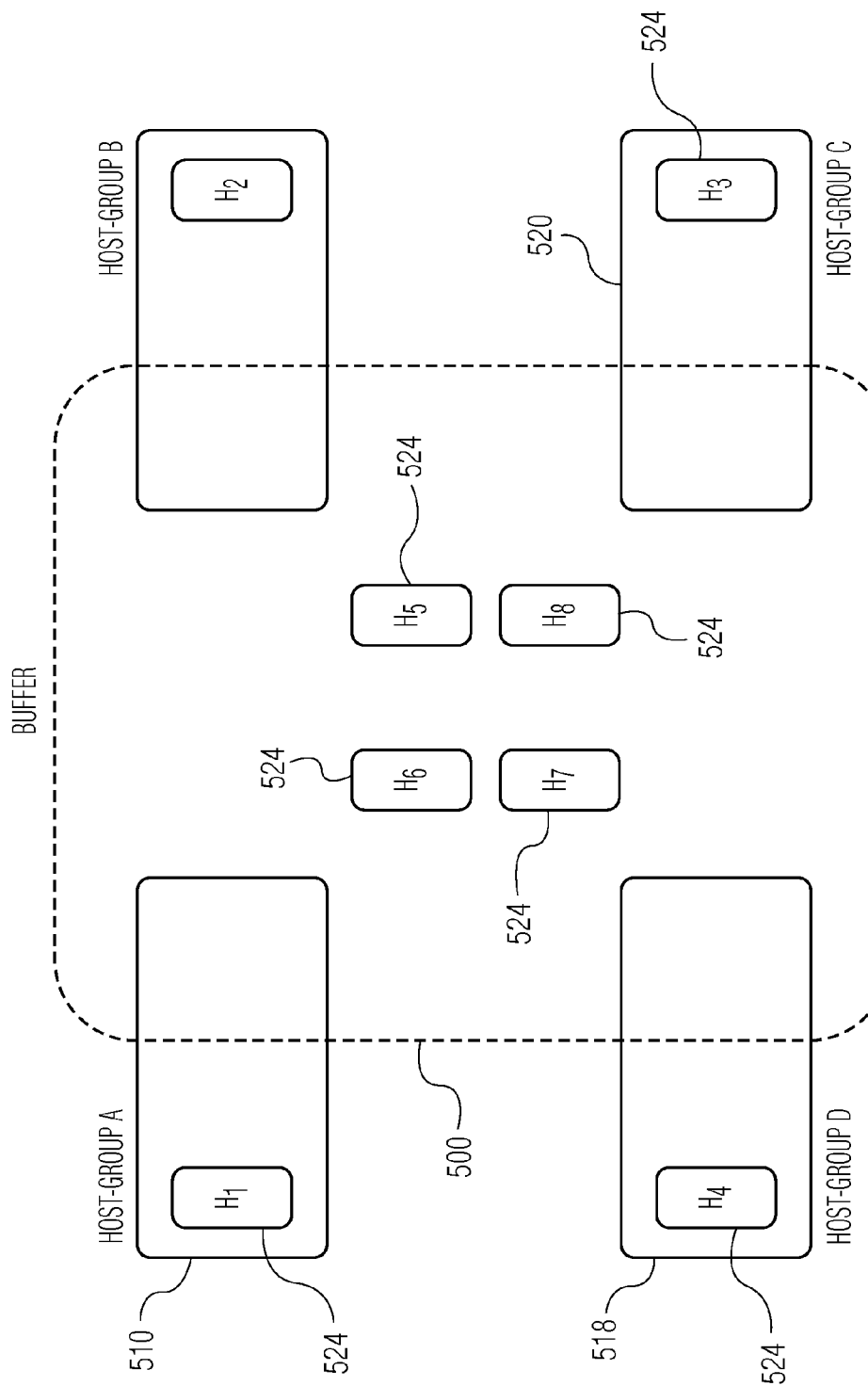
FIG. 5A depicts host computers grouped into a buffer in accordance with an embodiment of the invention.
Figure 5B:
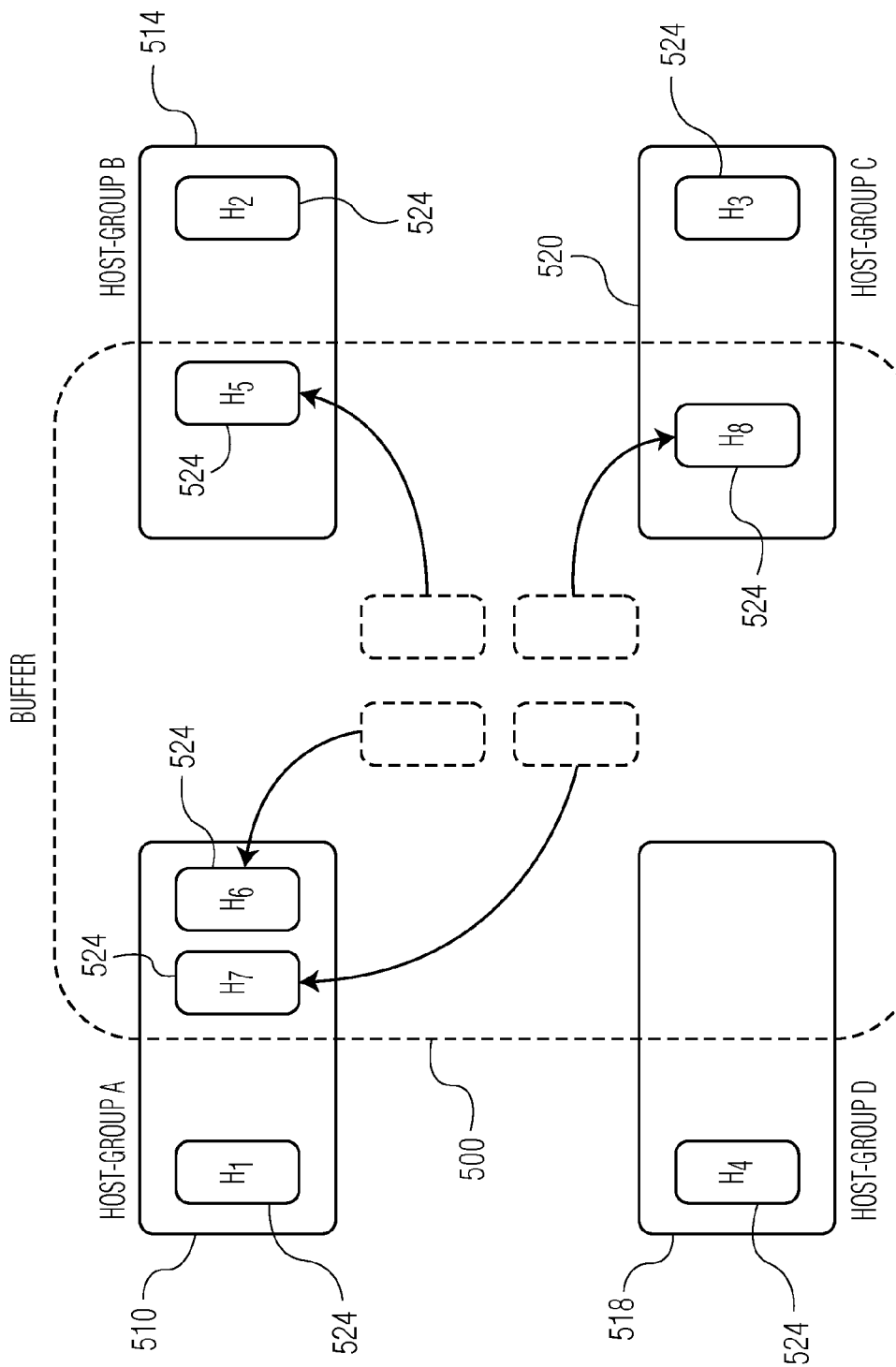
FIG. 5B depicts host computers mapped to host-groups in accordance with an embodiment of the invention.

In an alternative embodiment, the DRS can trigger the mapping of host computers from a buffer to host-groups that need additional resources. For example, a cluster is configured so that idle host computers (e.g., per se under-utilized host computers) are logically grouped into a buffer referred to as a "buffer group." FIG. 5A depicts host computers 524 logically grouped into a buffer group 500 in accordance with an embodiment of the invention. As illustrated by FIG. 5A, Host-group A 510 includes HOST 1, Host-group B 514 includes HOST 2, Host-group C 520 includes HOST 3, Host-group D 518 includes HOST 4, and the buffer group includes HOSTs 5, 6, 7, and 8. When a VM entity associated with Host-group A is determined to need more resources, the DRS checks to see if there are host computers in the buffer group and, since there are, the DRS triggers HOST 6 and HOST 7 to be mapped from the buffer group to Host-group A. In this example, HOST 5 and HOST 8 are mapped to Host-group B and Host-group C respectively for similar reasons. FIG. 5B illustrates HOST 6 and 7 being mapped to Host-group A, HOST 5 being mapped to Host-group B, and HOST 8 being mapped to Host-group C. In an embodiment, a DRS performs the mappings and is able to map HOSTs 5-8 without determining if the host computers are available because host computers in the buffer group are presumed to be idle and, thus, available. In addition to making more resources available (i.e., the resources of HOST 6 and HOST 7) to the host-group to which the host computers were mapped, mapping the host computers from the buffer group rather than from a host-group has the added benefit of not reducing the resources available in the other host-groups because the mapped host computers were not taken from another host-group that is actively supporting VMs.

While FIG. 5B depicts one mapping of host computers 524 from the buffer group 500, other mappings could be used as well. Because other mappings could be used, the donor set (i.e., the set of host computers mapped to each host-group) is not fixed, thus making resource allocation more adaptable to changing circumstances in the cluster. Additionally, in another embodiment, an order of preference can be predefined for each host computer in order to arbitrate conflicts between host-groups that are requesting additional hosts. For example, HOST 6 can be configured to have an order of preference that orders Host-group A before any other Host-group. Thus, when a VM entity running on Host-group A 510 and a VM entity running on Host-group B 514 are both determined to need additional resources, if HOST 6 is available, HOST 6 will be mapped to Host-group A. In an alternative embodiment, host computers can be part of multiple host-groups and, thus, HOST 6 can be mapped to Host-group A and Host-group B simultaneously.

While a technique for mapping host computers 324 between host-groups 410, 414, as described with reference to FIGS. 4A and 4B, is discussed separately from a technique using a buffer group 500, as described with reference to FIGS. 5A and 5B, in an embodiment, the two techniques can be combined so that, after all the host computers 524 available in the buffer have been mapped to host-groups 510, 514, 518, 520, host computers from the host-groups can be mapped to different host-groups. For example, if a VM entity running on Host-group A in FIG. 5B still needs additional resources, then because HOSTs 5-8 have all been mapped to host-groups and the buffer group is now empty, HOST 2 can be mapped from Host-group B 514 to Host-group A 510 if the DRS determines that HOST 2 is available from Host-group B.

In an embodiment, whether more resources are required and whether a host computer is available is determined based on the number of host computer failures a certain host-group can tolerate while still providing all necessary resources to VMs in the host-group. For example, if a host-group is attempting to support six VMs across five host computers and would be unable to run all six VMs should any one of the host computers fail, then, in an embodiment, a DRS can determine that all of the host computers allocated to the host-group are not available and, furthermore, that more resources are required. Alternatively, if a host-group can support all running VMs after several host computers fail, then a DRS can determine that at least one host computer within the host-group is available.

Figure 5C:
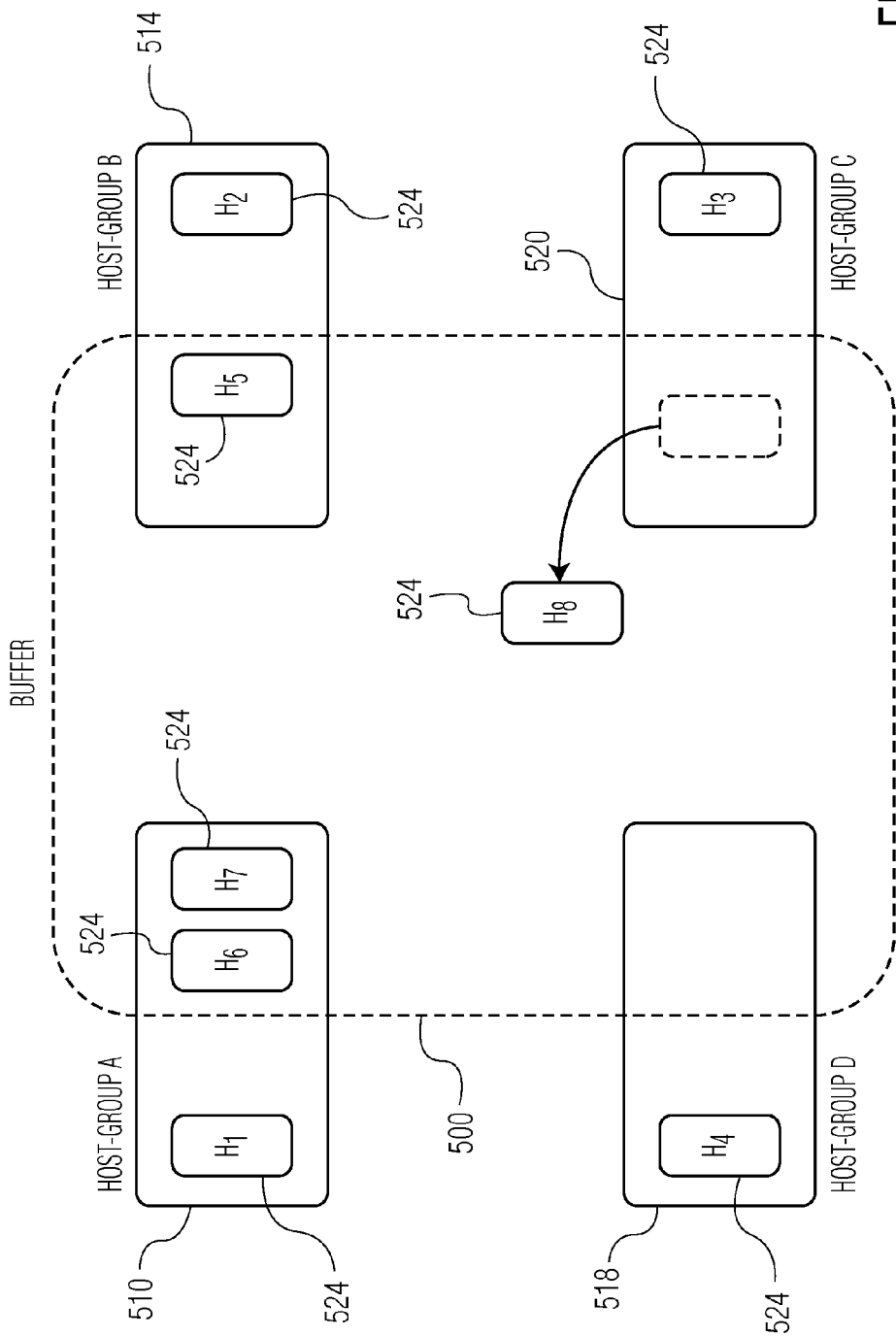
FIG. 5C depicts a host computer returning to its origin group in accordance with an embodiment of the invention.

In addition to triggering the mapping of host computers in response to VM entities needing additional resources, the DRS can trigger the mapping of host computers back to the group (i.e., host-group or buffer group) to which the host computer was originally mapped (i.e., an origin group) when a host computer is no longer needed. FIG. 5C illustrates the mapping of a host computer 524 back to its origin group (in this case, the buffer group 500.) As described with reference to FIGS. 5A and 5B, when the DRS determines that a VM entity needs additional resources, the DRS can borrow a host computer from the buffer group or, if the buffer group is empty, the DRS can borrow a host computer from another host-group (if a host computer in the host-group is available) and map the borrowed host computer to the host-group associated with the VM entity needing additional resources. The DRS will continue to monitor the VM entity and, when the DRS determines that the VM entity no longer needs additional resources, the DRS can trigger the borrowed host computer to be mapped back to its origin group. For example, as described with reference to FIGS. 5A and 5B, when the VM entity running on Host-group C 520 experiences an increase in activity and needs additional resources, the DRS borrows HOST 8 from the buffer group and triggers the mapping of HOST 8 to Host-group C. The DRS continues to monitor the VM entity running on Host-group C and, once the increase of activity in the VM entity subsides, the DRS determines that the VM entity no longer needs HOST 8. As illustrated in FIG. 5C, the DRS triggers HOST 8 to be mapped back to the buffer group. Although FIGS. 5A, 5B, and 5C illustrate HOST 8 being mapped from its origin group to Host-group C and back again, a host computer can be mapped from any group before being mapped back to its origin group once the host computer is no longer needed. For example, HOST 8 could first be mapped to Host-group B before being mapped to Host-group C, but would still be mapped back to the buffer group once Host-group C no longer needs HOST 8. By mapping host computers back to their origin group once they are no longer needed, an administrator can configure a cluster of host computers into a desired configuration and the DRS can automatically maintain the desired host-group and buffer group configuration while still allowing for temporary resource reallocation if needed.

Figure 6:
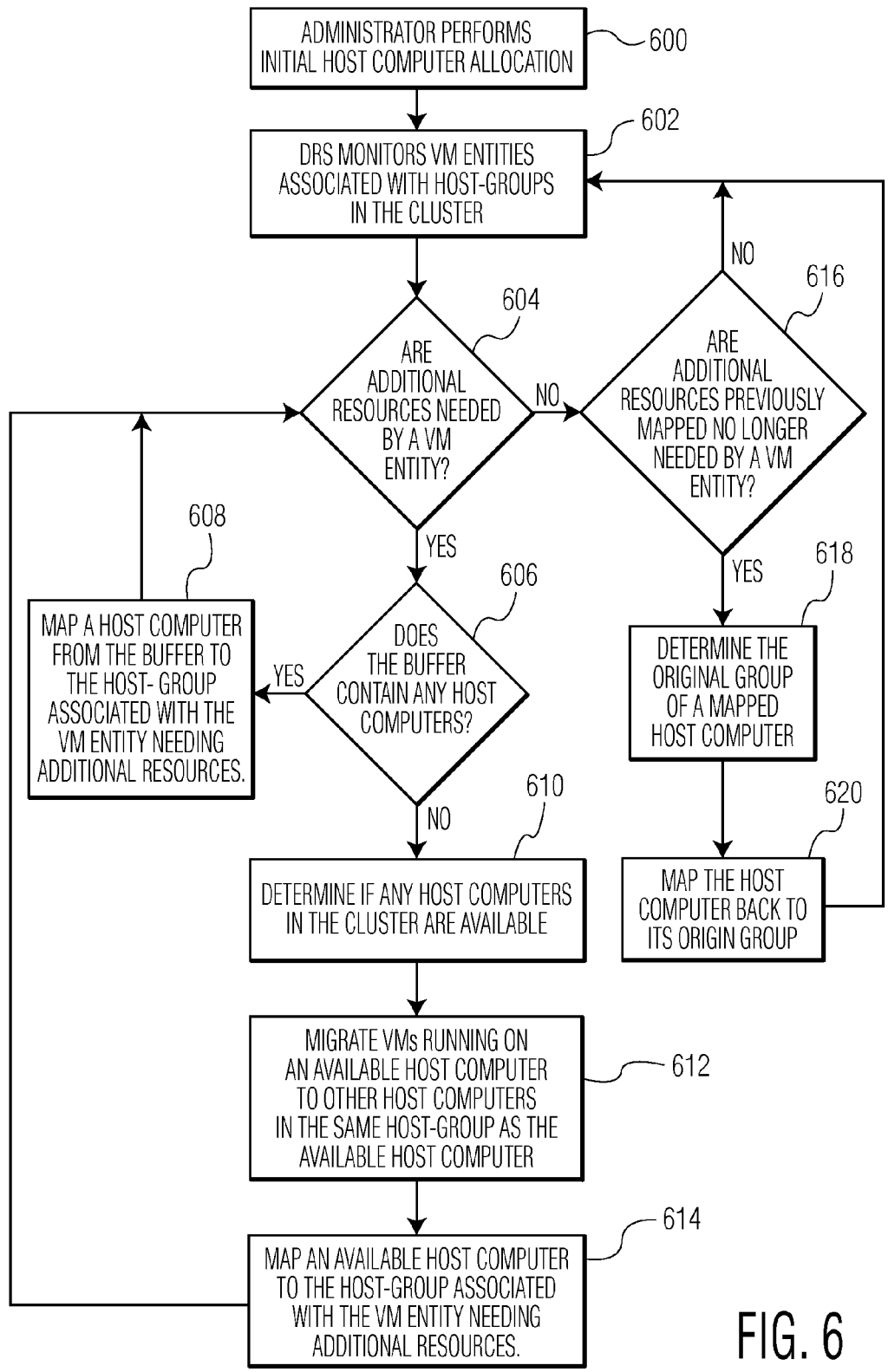
FIG. 6 is a flow chart diagram of the DRS decision process for automatically reallocating resources while maintaining a desired host-group and buffer configuration.

FIG. 6 is a flow chart diagram of an embodiment of the DRS decision process for automatically reallocating resources while maintaining a desired configuration. At block 600, an administrator performs an initial host computer allocation. In an embodiment, the initial host computer allocation entails associating host-groups with VM entities that will be running in a cluster and defining host-group rules for each host-group. Host computers that satisfy the host-group rules are then added to the host-groups while other host computers are added to a buffer group. In an embodiment, host computers are added to host-groups and to the buffer group in a manner that results in a configuration that is desired by the administrator. For example, an administrator might add one host computer to each host group and allocate all remaining host computers to the buffer group, thus allowing host computers to be shared evenly with all host-groups in the cluster. At block 602, the DRS monitors VM entities that are associated with the host-groups in the cluster to determine if additional resources are needed by the VM entities. At decision point 604, the DRS determines if additional resources are needed by the VM entities. As described above, this determination can be made in response to triggers such as, for example, a user-initiated request, an observed need, or a calendared event. If additional resources are needed, then, at decision point 606, the DRS determines if the buffer group contains any host computers. If the buffer group contains a host computer, then, at block 608, the DRS triggers the host computer to be mapped from the buffer group to the host-group associated with the VM entity needing additional resources. Alternatively, if the buffer group does not contain any host computers, then, at block 610, the DRS determines if any host computers in the cluster are available as discussed above. At block 612, the DRS then triggers VMs running on the available host computer to be migrated to other host computers in the same host-group as the available host computer and, at block 614, the DRS triggers the available host computer to be mapped to the host-group associated with the VM entity needing additional resources. The DRS then returns to decision point 604 and determines if any additional resources are still needed by a VM entity.

Alternatively, at decision point 604, if the DRS determines that additional resources are not needed, then, at decision point 616, the DRS determines if any additional resources (e.g., host computers from the buffer group or other host-groups) have been previously mapped to a host-group associated with a VM entity that no longer needs the additional resources. If no additional resources have been previously mapped then the DRS returns to block 602 and continues to monitor VM entities associated with host-groups in the cluster. If additional resources (i.e., a host computer) that have been previously mapped are no longer needed, then, at block 618, the DRS determines the origin group for the previously mapped host computer and, at block 620, triggers the mapping of the host computer back to its origin group. Once the host computer has been mapped back to its origin group, the DRS returns to block 602 and continues to monitor VM entities associated with host-groups in the cluster.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A non-transitory computer-readable storage medium containing program instructions for managing host computers that run virtual machines into host-groups within a cluster, wherein execution of the program instructions by one or more processors causes the one or more processors to perform steps comprising:
   determining if a virtual machine entity needs additional resources; and
   if the virtual machine entity needs additional resources, mapping an available host computer to a host-group with which the virtual machine entity is associated;
   wherein if two or more virtual machine entities need additional resources, the available host computer is mapped to one of the two or more host-groups associated with the virtual machine entities in accordance with a predefined order of preference as provided by the available host computer, which orders host-groups for the available host computer in order to arbitrate conflicts between the two or more host-groups associated with the virtual machine entities.

2. The non-transitory computer-readable storage medium of claim 1, wherein the mapped host computer is borrowed from a group to which the host computer was originally mapped and is automatically mapped back to its origin group once the virtual machine entity no longer needs the borrowed host computer.

3. The non-transitory computer-readable storage medium of claim 2, wherein the borrowed host computer is no longer needed if the host-group associated with the virtual machine entity has a host computer that can be made available.

4. The non-transitory computer-readable storage medium of claim 2, wherein the borrowed host computer is originally assigned to a buffer group comprised of available host computers.

5. The non-transitory computer-readable storage medium of claim 2, wherein the borrowed host computer is originally assigned to a host-group with an available host computer.

6. The non-transitory computer-readable storage medium of claim 1, wherein mapping the host computer to the host-group comprises migrating VMs running on the host computer to other host computers belonging to host-groups to which the VMs can be migrated before mapping the host computer.

7. The non-transitory computer-readable storage medium of claim 1, wherein mapping the host computer to the host-group includes applying a DRS profile associated with the host-group to the host computer.

8. The non-transitory computer-readable storage medium of claim 1, wherein a virtual machine entity is determined to need additional resources in response to a change in the cluster.

9. The non-transitory computer-readable storage medium of claim 1, wherein a virtual machine entity is determined to need additional resources based on a predicted need.

10. A computer system comprising:
    at least one processor and memory for managing host computers in a cluster, the at least one processor being configured to execute instructions stored in the memory to perform steps comprising:
    determining if a virtual machine entity needs additional resources; and
    if the virtual machine entity needs additional resources, mapping an available host computer to a host-group with which the virtual machine entity is associated;
    wherein if two or more virtual machine entities need additional resources, the available host computer is mapped to one of the two or more host-groups associated with the virtual machine entities in accordance with a predefined order of preference as provided by the available host computer, which orders host-groups for the available host computer in order to arbitrate conflicts between the two or more host-groups associated with the virtual machine entities.

11. The computer system of claim 10, wherein the mapped host computer is borrowed from a group to which the host computer was originally mapped and is automatically mapped back to its origin group once the virtual machine entity no longer needs the borrowed host computer.

12. The computer system of claim 11, wherein the borrowed host computer is no longer needed if the host-group associated with the virtual machine entity has a host computer that can be made available.

13. The computer system of claim 11, wherein the borrowed host computer is originally assigned to a buffer group comprised of available host computers.

14. The computer system of claim 11, wherein the borrowed host computer is originally assigned to a host-group with an available host computer.

15. The computer system of claim 10, wherein mapping the host computer to the host-group comprises migrating VMs running on the host computer to other host computers belonging to host-groups to which the VMs can be migrated before mapping the host computer.

16. The computer system of claim 10, wherein mapping the host computer to the host-group includes applying a DRS profile associated with the host-group to the host computer.

17. A non-transitory computer-readable storage medium containing program instructions for managing host computers that run virtual machines into host-groups within a cluster, wherein execution of the program instructions by one or more processors causes the one or more processors to perform steps comprising:
    mapping a host computer to a host-group associated with a virtual machine entity that needs additional resources; and
    mapping the host computer back to its origin group once the host computer is no longer needed by the virtual machine entity;
    wherein if two or more virtual machine entities need additional resources, the host computer is mapped to one of the two or more host-groups associated with the virtual machine entities in accordance with a predefined order of preference as provided by the available host computer, which orders host-groups for the available host computer as provided by the available host computer in order to arbitrate conflicts between the two or more host-groups associated with the virtual machine entities.

18. The non-transitory computer-readable storage medium of claim 17, wherein the origin group of a host computer is established by a user-defined configuration.

19. The non-transitory computer-readable storage medium of claim 17, wherein the host computer is no longer needed if the host-group associated with the virtual machine entity has a host computer that can be made available.

20. The non-transitory computer-readable storage medium of claim 1, wherein an available host computer is a host computer on which no VMs are running.

* * * * *